United States Patent [19]

Shiroishi et al.

[11] Patent Number: 4,786,553
[45] Date of Patent: Nov. 22, 1988

[54] MAGNETIC RECORDING MEDIUM

[75] Inventors: Yoshihiro Shiroishi, Hachioji; Sadao Hishiyama, Sayama; Hiroyuki Suzuki, Kokubunji; Norikazu Tsumita, Kanagawa; Tsuneo Suganuma, Tokorozawa; Yoshio Gobara, Hadano; Masaaki Hayashi, Odawara; Makoto Sano, Kanagawa; Takaaki Shirakura, Chigasaki, all of Japan

[73] Assignee: Hitachi, Ltd., Tokyo, Japan

[21] Appl. No.: 30,600

[22] Filed: Mar. 27, 1987

[30] Foreign Application Priority Data

Mar. 28, 1986 [JP] Japan .................................. 61-68327
Mar. 28, 1986 [JP] Japan .................................. 61-68329
Dec. 24, 1986 [JP] Japan .................................. 61-306421

[51] Int. Cl.$^4$ ...................... H01F 10/10; H01F 10/26
[52] U.S. Cl. .................................... 428/336; 428/469; 428/639; 428/667; 428/680; 428/694; 428/702; 428/900
[58] Field of Search ............... 428/611, 694, 678, 680, 428/900, 928, 469, 336, 639, 667, 702

[56] References Cited

U.S. PATENT DOCUMENTS

| | | | |
|---|---|---|---|
| 4,525,759 | 6/1985 | Valayil et al. ...................... | 428/694 |
| 4,567,116 | 1/1986 | Sawada et al. ...................... | 428/900 |
| 4,596,735 | 6/1986 | Noguchi et al. ................... | 428/900 |
| 4,599,280 | 7/1986 | Izumi et al. ......................... | 428/694 |
| 4,603,091 | 7/1986 | Mukusa et al. ..................... | 428/611 |
| 4,609,593 | 9/1986 | Nakashima et al. ................ | 428/611 |
| 4,610,911 | 9/1986 | Opfer et al. ........................ | 428/900 |
| 4,707,756 | 11/1987 | Futomoto et al. .................. | 428/694 |

FOREIGN PATENT DOCUMENTS

| 137602 | 10/1981 | Japan . |
|---|---|---|
| 74606 | 4/1984 | Japan . |
| 116925 | 7/1984 | Japan . |
| 35327 | 2/1985 | Japan . |
| 120628 | 6/1987 | Japan . |
| 120627 | 6/1987 | Japan . |

Primary Examiner—George F. Lesmes
Assistant Examiner—William M. Atkinson
Attorney, Agent, or Firm—Antonelli, Terry & Wands

[57] ABSTRACT

A magnetic recording medium comprises a non-magnetic substrate and a thin magnetic film, the thin magnetic film being composed mainly of Co, Ni and at least one of Zr and Hf, and a concentration of Zr, Hf or Zr and Hf as contained in the thin magnetic film being 0.1 to 30% by atom on the basis of the total of Co and Ni, and has a considerably higher corrosion resistance than that of the conventional magnetic recording medium having a thin Co-Ni magnetic film.

26 Claims, 8 Drawing Sheets

| ADDITIVE ELEMENT M | Ti ○ | V □ | Cr ◇ | — | — | — |
|---|---|---|---|---|---|---|
| | Zr ◐ | Nb ◨ | Mo ◈ | Ru △ | Rh ▽ | Pd × |
| | Hf ● | Ta ■ | W ◆ | — | — | Pt + |

MAGNETIC RECORDING MEDIUM

BACKGROUND OF THE INVENTION

This invention relates to a magnetic recording medium for a magnetic disk apparatus, etc., and more particularly to a magnetic recording medium of high reliability in corrosion resistance, wear resistance, etc. suitable for a high recording density.

As disclosed in Japanese Patent Publication No. 54-33523, a magnetic recording medium using a metallic magnetic thin film has been proposed for a high recording density. Generally, a magnetic recording medium is formed by evaporation, sputtering, plating, ion beam sputtering, etc. With the recent increasing demand for a higher recording density and a higher reliability, it has been proposed to add a third element such as Cr, Nb, etc. to a magnetic metal particularly to increase the corrosion resistance, as disclosed in Japanese Patent Application Kokai (Laid-open) Nos. 57-15406 and 57-196508. However, almost all of these proposed prior art relate to magnetic recording tapes, and have not yet satisfied strict requirements for the reliability as required for computer hard disks, etc.

SUMMARY OF THE INVENTION

An object of the present invention is to provide a magnetic recording medium composed of a thin Co-Ni based magnetic metal film having an improved corrosion resistance and substantially having distinguished magnetic properties of the thin magnetic metal film.

This object and other objects can be attained by a magnetic recording medium comprising a non-magnetic substrate and a thin magnetic film formed thereon, characterized in that the thin magnetic film is composed mainly of Co, Ni, and at least one of Zr and Hf, concentration of Zr or a concentration of Hf or a concentration of Zr and Hf as contained in the thin magnetic film is 0.1 to 30% by atom on the basis of the total of Co and Ni.

DETAILED DESCRIPTION OF PREFERRED EMBODIMENTS

As a result of extensive studies of the magnetic properties, corrosion resistance, etc. of sputtered thin magnetic films prepared using Co-Ni alloy targets each containing 4th, 5th, 6th period elements, etc. of Groups Ib, IIIa, IVa, Va and VIII of the periodic table, it has been found that it is very effective to add at least one of Zr and Hf to the thin magnetic Co-Ni alloy films.

When the thin magnetic film contains Zr, it is preferable that the concentration of Zr is 0.1 to 30% by atom on the basis of the total of Co and Ni. In order to improve the magnetic properties, a concentration of Ni is desirably 10 to 60% by atom, more desirably 20 to 50% by atom, and most desirably 30 to 48% by atom on the basis of Co. Furthermore, the concentration of Zr is more preferably 2 to 20% by atom, more desirably 2 to 15% by atom, further desirably 3 to 12% by atom, and still further desirably 4 to 11% by atom on the basis of the total of Co and Ni.

When the thin magnetic film contains Hf or both Hf and Zr, the concentration of Hf or the concentration in total of Hf and Zr is preferably 0.1 to 30% by atom on the basis of the total of Co and Ni. In the latter case containing both Hf and Zr, the concentration of Hf is desirably 2 to 3% by weight on the basis of Zr from the viewpoint of mass productivity. Furthermore, the concentration of Hf or the concentration in total of Hf and Zr is more preferably 0.1 to 15% by atom, most preferably 2 to 10% by atom on the basis of the total of Co and Ni.

According to the present invention, a magnetic recording medium having particularly distinguished read-and-write characteristics can be provided by forming a Cr intermediate layer having a thickness of 100 to 5,000 Å between the thin magnetic film and the non-magnetic substrate, or, in case the magnetic recording medium uses a metallic substrate, by oxidizing the surface of the metallic substrate to a depth of 10 to 400 Å, and forming the thin magnetic film directly thereon or through the Cr intermediate layer.

According to the present invention, a magnetic recording medium particularly suitable for the perpendicular magnetic recording can be provided by forming at least one of a Si intermediate layer, a C intermediate layer and a Ge intermediate layer each having a thickness of 20 to 1,000 Å on the surface of the substrate. Furthermore, a magnetic recording medium having a further improved corrosion resistance and a distinguished wear resistance can be provided by forming a non-magnetic protective layer having a thickness of 100 to 1,000 Å on the surface of the magnetic recording medium.

The distinguished characteristics of the present invention are based on the following functions.

Thin magnetic films of $(Co_{0.7}Ni_{0.3})_{0.9}Zr_{0.1}$, $(Co_{0.8}Ni_{0.2})_{0.8}Zr_{0.2}$, $(Co_{0.9}Ni_{0.1})_{0.7}Zr_{0.3}$ and $(Co_{0.6}Ni_{0.4})_{0.95}Zr_{0.05}$ formed on glass substrates by RF sputtering at a substrate temperature of 150° C. in 5m Torr of Ar with a power density of 5 W/cm² were analyzed by Auger electron spectroscopy, anodic polarization curve, etc., and it was found that any of the thin magnetic films had a high Zr concentration to a depth of about 60 to about 30 Å from the surface, and a dense surface oxide layer was formed.

Figure 9:
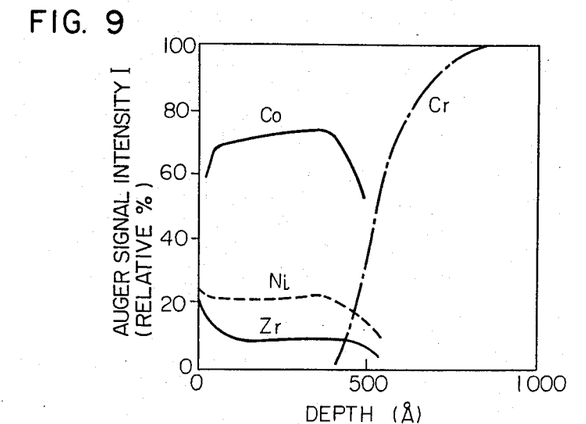
FIG. 9 is a diagram showing compositions with depth of a CoNiZr/Cr film.

In FIG. 9, a typical Auger depth profile of a thin CoNiZr magnetic film is shown, where the sample was prepared by forming a Cr underlayer having a thickness of 5,000 Å on a Si substrate at 150° C. in 10 m Torr of Ar with a power density of 2 W/cm² and successively forming a film of $(Co_{0.7}Ni_{0.3})_{0.95}Zr_{0.05}$ thereon. The same Auger depth profile was obtained when a non-magnetic protective layer of C, etc. was formed on the thin magnetic film, and no nitrogen, oxygen, etc. were observed in the thin magnetic film. That is, Zr was concentrated predominantly on the surface of the thin magnetic film to form a dense passivation layer, and thus the corrosion resistance of the thin magnetic film was considerably improved.

This effect was observed whenever the concentration of Zr was 0.1% by atom or higher. On the other hand, the saturation magnetization of the magnetic recording medium was lowered by the addition of Zr, but it was found that so far as the concentration of Zr was not more than 30% by atom on the basis of the total of Co and Ni, the saturation magnetization was equivalent or superior to that of the oxide media and had no practical problem.

Figure 10:
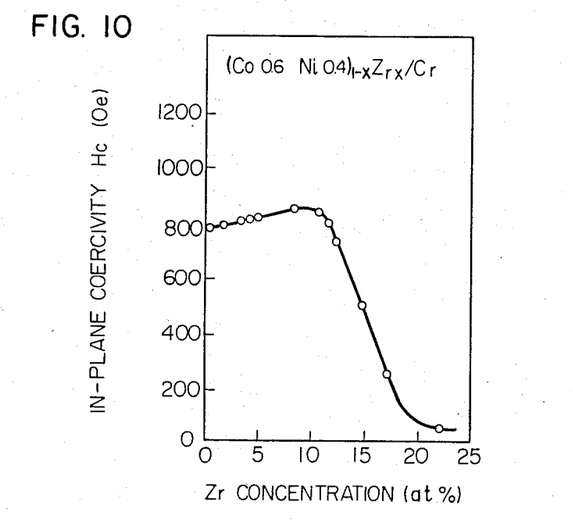
FIG. 10 is a diagram showing a relationship between the in-plane coercivity of the present magnetic disk and the Zr concentration of the thin magnetic film.

However, as disclosed in Japanese Patent application Kokai (Laid-open) No. 56-44752 (=U.S. Pat. No. 4,306,908) and IEEE, Trans. on Magn., MAG-16 (1986) pp 1129-1131, it is known that the CoNiZr alloy is liable to become amorphous and has a lower coercivity, when prepared by a rapidly quenching technique, and thus is suitable as a magnetic material for recording heads, but is not preferable as a magnetic material for recording media. On the other hand, it was found that when a thin CoNiZr magnetic film was formed by sputtering, evaporation, ion-beam sputtering, etc. after the formation of a body-centered cubic structure of Cr, Mo, W, etc., a predominantly crystalline structure and magnetic properties suitable for a magnetic recording medium, for example, a coercivity of 500 Oe or higher could be obtained without any heat treatment. That is, when a Cr intermediate layer having a thickness of 2,500 Å was formed on a glass substrate or an NiP-plated Al alloy substrate and thin magnetic films of $(Co_{0.6}Ni_{0.4})_{1-x}Zr_x$, (where x=0, 0.02, 0.03, 0.08, 0.11, 0.12, 0.125, 0.15, 0.175 and 0.225) having a thickness of 600 Å were formed thereon by DC sputtering at a substrate temperature of 180° C. in 5 m Torr of Ar with a power density of 5 W/cm², polycrystalline films having a coercivity as high as or higher than 500 Oe could be obtained at a low concentration of Zr, where at a higher concentration of Zr than 15% by atom the films suddenly became amorphous and the coercivity became less than 500 Oe, as shown in FIG. 10. So far as the concentration of Zr was between 15 and 30% by atom, the thin magnetic Co-NiZr films could be crystallized and given a high coercivity by heat treating the substrate at 280° to 500° C. That is, the films can be used for magnetic recording media so far as the concentration of Zr is in the said range.

Generally, an Al alloy disk plated with amorphous NiP containing 10.5 to 12% by weight of P to a thickness of 5 to 30 μm is used as a disk substrate to improve the durability of the disk and also improve the surface flatness and fliability thereof. The substrate will be crystallized and magnetized by heat treatment at 250° to 300° C. for about 3 hours, and thus the heat treatment of the substrate is rather unpreferable.

Figure 5:
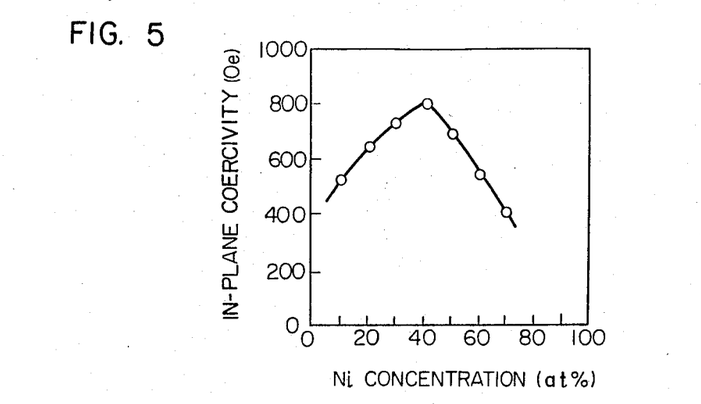

Furthermore, such a heat treatment should be carried out desirably just before the formation of a protective layer in order to suppress the reaction, but the process will be complicated thereby. Thus, in order to obtain a coercivity as high as 500 Oe without the heat treatment, the concentration of Zr is desirably not more than 15% by atom, as is apparent from FIG. 10. In order to increase the corrosion resistance, the concentration of Zr is desirably not less than 2% by atom. In order to increase the coercivity by the addition of Zr, the concentration of Zr is desirably 3 to 12% by atom, more desirably 4 to 11% by atom, as is apparent from FIG. 10. In order to improve the read-and-write characteristics such as overwrite, etc., it is necessary to make a magnetic recording medium in a thin film form, and to this end it has been found that the concentration of Ni was desirably not more than 60% by atom on the basis of Co. On the other hand in order to improve the recording density of the medium, it is necessary to increase the coercivity of the medium. To this end, the concentration of Ni is desirably 20 to 50% by atom, more desirably 30 to 48% by atom on the basis of Co, as shown in FIG. 5. Further it is desirable to provide a Cr layer, a surface oxide layer of substrate, or at least one of Si layer, C layer and Ge layer as an intermediate layer for longitudinal and perpendicular magnetic recordings, respectively. From the viewpoints of magnetic properties such as coercivity, etc. and production efficiency, the thickness of Cr intermediate layer is preferably 100 to 5,000 Å, the thickness of the surface oxide layer of substrate is preferably 10 to 400 Å, and the thickness of at least one of Si, C and Ge layers is preferably 20 to 1,000 Å. Furthermore, the wear resistance and the corrosion resistance can be more improved by forming a non-magnetic protective layer having a thickness of at least 100 Å on the thin magnetic layer. However, when the thickness of the non-magnetic protective layer exceeds 1,000 Å, the spacing loss is increased, and this is not preferable from the viewpoint of read-and-write characteristics.

As a result of likewise analyzing by Auger electron spectroscopy, anodic polarization curves, etc. of thin magnetic films of:

$(Co_{0.7}Ni_{0.3})_{0.9}Hf_{0.1}$, $(Co_{0.8}Ni_{0.2})_{0.8}Hf_{0.15}$, $(Co_{0.7}Ni_{0.3})_{0.98}(Hf_{0.5}Ar_{0.1})_{0.02}$, and $(Co_{0.7}Ni_{0.3})_{0.9}(Hf_{0.02}Zr_{0.98})_{0.1}$, formed each to a thickness of 500 Å on glass substrates, respectively, by RF sputtering at a substrate temperature of 150° C. in 5 m Torr of Ar at a flow rate of 20 SCCM with a power density of 7 W/cm², it was found that any of the thin magnetic films had a high concentration of Hf or Zr to a depth of about 40 to about 80 Å from the surface and a dense surface oxide layer was formed. That is, Hf or Zr was concentrated predominantly on the surface of the thin magnetic film to form a dense passivation film, and thus the corrosion resistance of the thin magnetic film was considerably improved. This effect was observed whenever the concentration of Hf or Zr was 0.1% by atom or higher. On the other hand, the saturation magnetization of the magnetic recording medium was lowered by the addition of Hf or Hf and Zr, but it was found that so far as the concentration of Hf or Hf and Zr was not more than 30% by atom on the basis of the total of Co and Ni, the saturation magnetization was equivalent or superior to that of the oxide media and had no practical problem. However, in order to improve the read-and-write characteristics such as overwrite, etc., it is necessary to make a magnetic recording film in a thin film form, and to this end it was found that the concentration of Ni was preferably 20 to 40% by atom on the basis of Co, and the concentration of Hf or Hf and Zr was 0.1 to 15% by atom on the basis of the total of Co and Ni.

One embodiment of the present invention will be described in detail below, referring to FIG. 1.

Numeral 11 is a substrate composed of an Al alloy or the like, 12 and 12' are non-magnetic plating layers composed of Ni-P, Ni-W-P, or the like, 13 and 13' are intermediate layers composed of Cr, or the like, and 14 and 14' are thin magnetic layers composed of a Co-Ni-Zr alloy, as prepared in the following manner:

Non-magnetic 12 wt. % P-Ni plated layers 12 and 12' were formed to a thickness of 20 μm on an Al alloy substrate 11, 130 mm in outer diameter, 40 mm in inner diameter and 1.9 mm thick, and then thin Cr layers 13 and 13' were formed to a thickness of 2,500 Å thereon at a substrate temperature of 180° C. in 5 m Torr of Ar with an RF power density of 4 W/cm². Then, thin magnetic films 14 and 14' were formed to a thickness of 600 Å from $Co_{0.7}Ni_{0.3}$ alloy targets each containing 0.05%, 0.1%, 1%, 10%, 15%, 20%, 30%, 40%, and 50% by atom of at least one of Ti, Zr, V, Nb, Ta, Cr, Mo, W, Ru, Rh, Pd and Pt as a third element under the same conditions as above.

Figure 2:
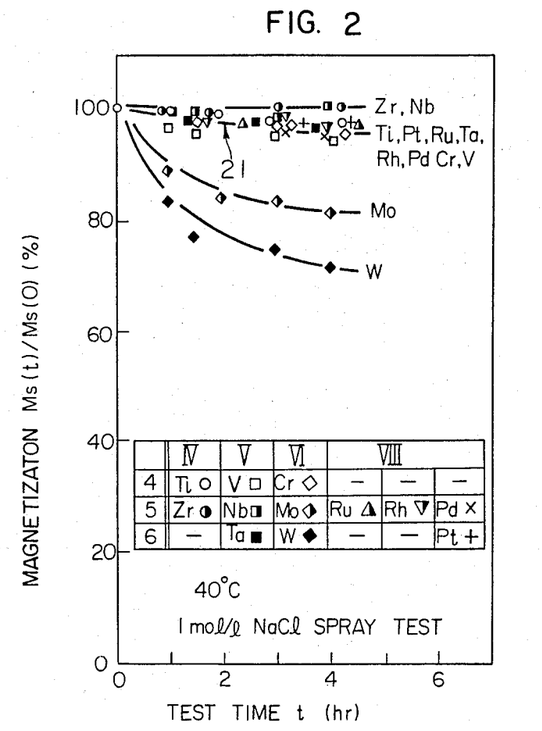
FIG. 2 and FIG. 3 are diagrams showing results of 1 mol/l-NaCl spray tests and 1 mol/l-NaCl dip tests for the present magnetic disks and comparative magnetic disks, respectively.

FIG. 2 shows results of 1 mol/l-NaCl spray tests at 40° C., where changes with time in the saturation magnetization of magnetic recording disks containing 10% by atom of the third element on the basis of the total of Co and Ni are shown, and the plot 21 shows the result of a magnetic recording disk using a thin magnetic $Co_{0.7}Ni_{0.3}$ alloy film. It is seen therefrom that the corrosion resistance of CoNi alloys can be improved by the addition of Ti, Pt, Ru, Ta, Rh, V, Nb, Cr, Zr or Pd, and particularly the addition of Zr or Nb can give a distinguished corrosion resistance without much deterioration of the saturation magnetization. Substantially the same effect could be obtained by addition of at least 0.1% by atom of the third element.

Then, Cr intermediate layers 13 and 13' were formed to a thickness of 1,500 Å on an Al alloy substrate, 220 mm in outer diameter and 1.9 mm thick, having non-magnetic 11 wt. % P-Ni plated layers 12 and 12' having a thickness of 15 μm at a substrate temperature of 150° C. in 10 m Torr of Ar with a DC powder density of 7 W/cm². Then, thin magnetic films 14 and 14' were formed to a thickness of 500 Å thereon, using $Co_{0.75}Ni_{0.25}$ alloy targets each containing 8% by atom of Zr, Rh, Nb, Pd, W or V under the same conditions.

Figure 3:
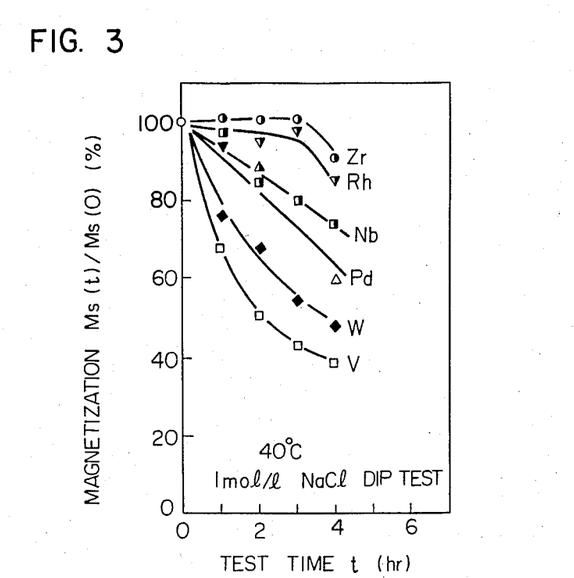

FIG. 3 shows changes with time in the saturation magnetization when the thus obtained disks were dipped in an aqueous 1 mol/l-NaCl solution at 40° C. It was found that particularly addition of Zr gave a considerable increase in the corrosion resistance, where the thin magnetic film was predominantly polycrystalline. This effect could be obtained with Zr as the main additive, and the distinguished corrosion resistance could also be obtained with Zr as the third element and Ti Pt, Ru, Ta, Rh, V, Nb, Cr or Pd as a fourth element. That is, the corrosion resistance of thin magnetic films prepared by adding 0.5 or 1.0% by atom of Ru, 1, 2 or 5% by atom of Ta, 1, 2, or 5% by atom of Cr, 1, 2 or 4% by atom of Ti, 2, 4 or 6% by atom of Nb, 0.2, 0.5, or 1.0% by atom of Rh, 0.2, 0.5 or 1.0% by atom of Pt, 0.2, 0.5 or 1.0% by atom of Pd, or 2, 4 or 6% by atom of V to $(Co_{0.3})_{0.95}Zr_{0.05}$, $Co_{0.6}Ni_{0.4})_{0.94}Ar_{0.06}$, or $(Co_{0.55}Ni_{0.45})_{0.95}Zr_{0.05}$ was evaluated by temperature/humidity tests in a chamber at 60° C., 90% RH and Class10000. The addition of the fourth element could suppress the reduction in the magnetization of any of the thin magnetic films after 2 weeks to less than 5%, and thus was found particularly effective. It seems that the addition of the fourth element makes the structure of surface oxide layer stronger and improves the resistance to uniform corrosion and oxidation. The foregoing effect was observed whenever at least 0.01% by atom of at least one of the fourth elements was contained. Above 15% by atom of the fourth element as contained, the saturation magnetization was considerably lowered, and thus this is not desirable.

In case of forming a Cr intermediate layer having a thickness of 2,000 Å and a thin magnetic layer having a thickness of 700 Å thereon, using an alloy target of $Co_{0.9}Ni_{0.1}$, $Co_{0.6}Ni_{0.4}$, $Co_{0.5}Ni_{0.5}$, $Co_{0.4}Ni_{0.6}$, $Co_{0.3}Ni_{0.7}$, or $Co_{0.62}Ni_{0.3}Cr_{0.008}$, each containing 15% by atom of Zr, the same effect as in the foregoing two embodiments were obtained by the addition of Zr, and the corrosion resistance was considerably improved by the addition of not less than 0.1% by atom of Zr, but the saturation magnetization and coercivity were considerably deteriorated by the addition of more than 30% by atom of Zr. That is, the addition of more than 30% by atom of Zr was found practically undesirable. Not more than 30% by atom of Zr was found preferable.

Figure 4:
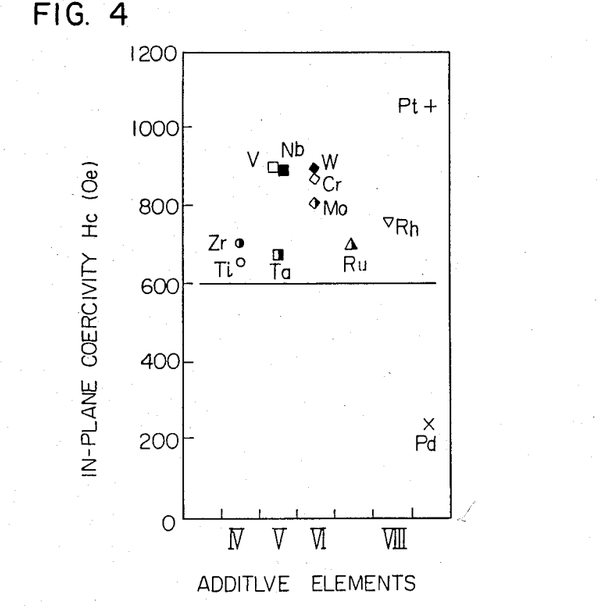
FIG. 4 and FIG. 5 are diagrams showing magnetic properties of the present magnetic disks and comparative magnetic disks.

FIG. 4 shows the coercivity for the magnetic disks shown in FIG. 2. The coercivity and the coercivity squareness are more than 600 Oe and more than 0.8, respectively, except for the magnetic disk containing Pd, and all of the magnetic disks except for that containing Pd have distinguished read-and-write characteristics.

In FIG. 5, the relationship between the coercivity and the concentration of Ni on the basis of Co is shown when a thin magnetic film of Co and Ni containing 12% by atom of Zr was formed to a thickness of 600 Å on a Cr intermediate layer having a thickness of 1,000 Å by DC magnetron sputtering in 7 m Torr of Ar with a power density of 8 W/cm². When the concentration of Ni on the basis of Co is 10 to 60% by atom, an in-plane coercivity of more than about 550 Oe necessary for the high density recording can be obtained. When the concentration of Ni is 20 to 50% by atom, much higher recording density can be obtained. Actually, a higher recording density than 20 KFCI could be obtained with a Mn-Zn ferrite ring head having a gap length of 0.4 μm at a flying height of 0.25 μm. Further in FIG. 5, a higher coercivity than 650 Oe can be obtained at a concentration of Ni of 20 to 50% by atom on the basis of Co, and a further higher coercivity than 750 Oe can be obtained at a concentration of Ni of 30 to 48% by atom, and thus these Ni concentration ranges are desirable from the viewpoint of the read-and-write characteristics.

Figure 11:
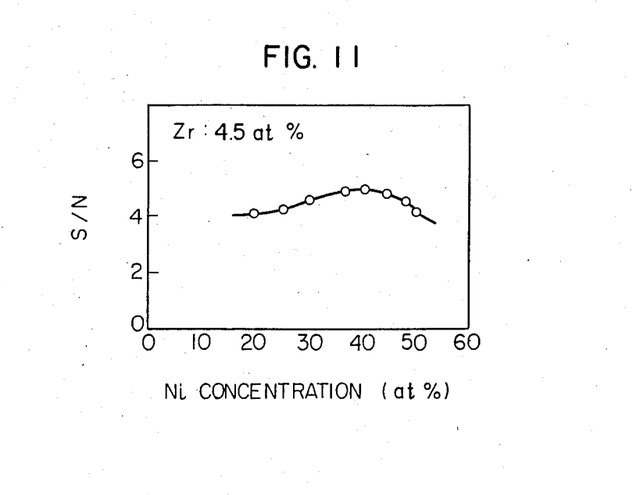
FIG. 11 is a diagram showing a relationship between S/N (signal-to-noise ratio) of the present magnetic disk and the Ni concentration of the thin magnetic film.

For example, 11.5 wt. % P-Ni was plated to a thickness of 20 μm onto an Al alloy substrate 11, 130 mm in diameter and 1.9 mm thick, and then the disk surfaces were polished and buffed with an $Al_2O_3$ or diamond abrasive to impart a uniform, circumferential texture with a surface roughness of 60 Å (Ra). Onto the thus obtained non-magnetic plated layers 12 and 12' having a reduced thickness of 15 μm were formed Cr intermediate layers 13 and 13' having a thickness of 3,000 Å at a substrate temperature of 200° C. in 15 m Torr of Ar with a power density of 1 W/cm². Then, a thin magnetic films 14 and 14' of $(Co_{1-x}Ni_x)_{0.955}Zr_{0.045}$ (X=0.2, 0.25, 0.3, 0.37, 0.40, 0.45, 0.48 or 0.50) having a thickness of 600 Å were formed on the Cr intermediate layers 13 and 13' under the same conditions as above, then non-magnetic C coated layers having a thickness of 450 Å were formed thereon in 3 m Torr of Ar with a power density of 8 W/cm², and finally liquid lubricant layers composed of perfluoroalkylpolyether were formed to a thickness of 40 Å thereon to make a magnetic disk. Then, the read-and-write characteristics of the magnetic disk were evaluated with a thin film magnetic head having a gap length of 0.4 μm. It was found, as shown in FIG. 11, that at a concentration of Ni of 30 to 48% by atom on the basis of Co, a particularly high signal-to-noise (S/N) ratio was obtained. That is, excellent read-and-write characteristics were obtained.

When the thin magnetic films were formed directly on the NiP plated layers in the foregoing embodiment, an in-plane coercivity of only about 50 Oe was obtained. Whereas a practically satisfactory in-plane coercivity could be obtained by forming the thin magnetic films through the Cr intermediate layers having a thickness of 100 Å or more. However, even when Cr intermediate layers having a thickness of more than 5,000 Å were formed, no higher effect on the coercivity could be obtained than that obtained through Cr intermediate layers having a thickness of not more than 5,000 Å. From the viewpoint of production efficiency, the thickness of Cr intermediate layer is not more than 5,000 Å, desirably not more than 3,000 Å.

When C intermediate layers 13 and 13' having a thickness of 100 Å were formed on Ni-W-P plating layers 12 and 12' having a thickness of 25 μm on an Al alloy substrate 11 at a substrate temperature of 100° C. in 5 m Torr of Ar with a power density of 4 W/cm², and thin magnetic films of $(Co_{0.6}Ni_{0.4})_{0.8}Zr_{0.2}$ –and 14' were formed to a thickness of 0.2 μm thereon under the same conditions as above, whereby a magnetic recording disk having distinguished corrosion resistance and perpendicular recording characteristics could be obtained. Similar results could be obtained with Si intermediate layers having a thickness of 200 Å and Ge intermediate layers having a thickness of 50 Å. Furthermore, the effect of intermediate layers was observed whenever the intermediate layer had a thickness of 20 Å or more, but practically the thickness of not more than 1,000 Å was found satisfactory.

Figure 1:
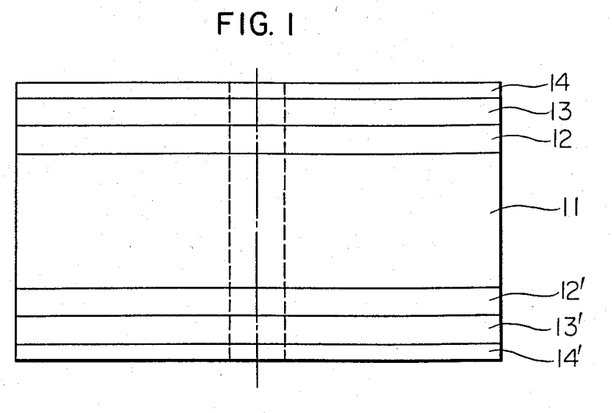
FIG. 1 is a cross-sectional view of a magnetic disk according to one embodiment of the present invention.
Figure 6:
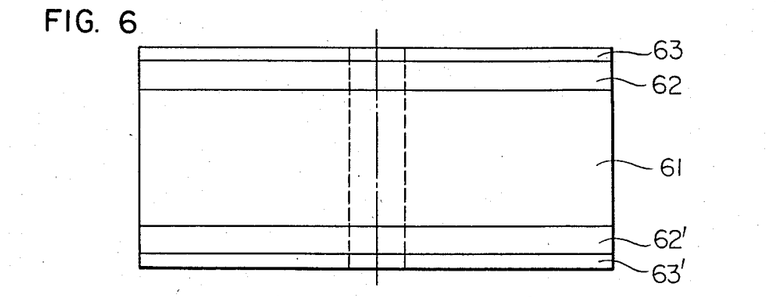
FIG. 6 is a cross-sectional view of a hard magnetic disk medium according to another embodiment of the present invention.

In FIG. 6, another embodiment of the present invention than that shown in FIG. 1 is given, which is composed of a substrate 61 composed of an Al alloy or the like, non-magnetic plated layers 62 and 62' and thin magnetic films 63 and 63' composed of Co-Ni-Zr.

An Al alloy substrate 61, 90 mm in outer diameter, having non-magnetic 11.5 wt. % Pt-Ni plated layers 62 and 62' having a thickness of 15 μm on the surfaces of the substrate was subjected to reactive sputter etching at a substrate temperature of 100° C. in 5 m Torr of Ar containing 20% by volume of 0 with a power density of 0.4 W/cm² to form surface oxide layers to a depth of 30 Å on both the surfaces, and then thin magnetic films 63 and 63' were formed to a thickness of 600 Å with a Co-Ni alloy target containing 5, 10 or 15% by atom of Zr at a substrate temperature of 150° C. in 5 m Torr of Ar with a power density of 6 W/cm².

Figure 7:
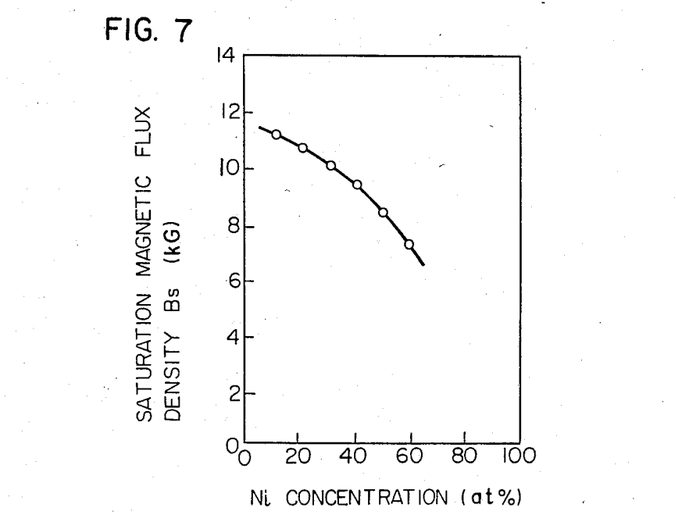
FIG. 7 is a diagram showing the magnetic property of the hard magnetic disk medium shown in FIG. 6.

In FIG. 7, a relationship between the saturation magnetic flux density of a thin magnetic film containing 10% by atom of Zr on the basis of the total of Co and Ni and the concentration of Ni on the basis of Co is shown. It is apparent therefrom that a practically satisfactory saturation magnetic flux density can be obtained at a concentration of Ni of not more than 50% by atom. An in-plane coercivity of the same level as that shown in FIG. 5 could be obtained, and distinguished read-and-write characteristics as those of the magnetic recording disks shown in FIG. 1 could be obtained. It was found that the corrosion resistance was a little inferior to that of the magnetic recording disk shown in FIG. 1, but had no problem at the practical level.

When the thin magnetic films were formed through Cr intermediate layers as shown in FIG. 1 on the oxide layers obtained by the reactive sputter etching of the NiP plating layers, the most distinguished read-and-write characteristics could be obtained.

Figure 12:
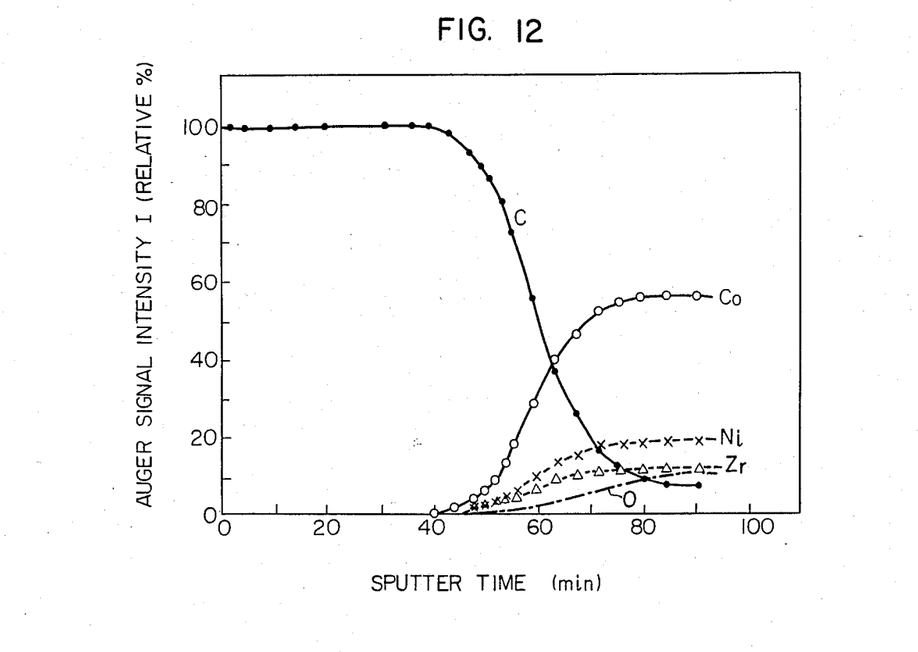
FIG. 12 is a diagram showing compositions with depth according to other embodiment of the present invention.

In other embodiment than the foregoing embodiment, thin magnetic films were formed in $O_2$-containing Ar to form magnetic recording disks with thin magnetic films having a concentration of oxygen of 0.1 to 15% by atom. In FIG. 12, typical examples of distribution in composition with depth (Auger depth profile) of magnetic recording disks according to the present invention are shown. In this embodiment, no other elements such as nitrogen, etc. were observed, and though there were such disadvantages that the saturation magnetization was reduced and the corrosion resistance was a little deteriorated, the magnetic recording disks without any practical problem could be obtained.

For example, 11 wt. % P-Ni was plated onto the surfaces of an Al alloy substrate 11, 130 mm in outer diameter, polished and buffed with an $Al_2O_3$ or diamond abrasive to impart a uniform, circumferential texture with a surface roughness of 70 Å, whereby non-magnetic plated layers 12 and 12' having a thickness of 10 μm were thus obtained on the surfaces of the substrate 11. Then, thin magnetic films 14 and 14' of $(Co_{0.7}Ni_{0.3})_{0.95}Zr_{0.05}$, $(Co_{0.7}Ni_{0.3})_{0.94}Zr_{0.06}$, $(Co_{0.65}Ni_{0.35})_{0.94}Zr_{0.06}$, $(Co_{0.60}Ni_{0.40})_{0.94}Zr_{0.06}$, $(Co_{0.7}Ni_{0.3})_{0.945}Zr_{0.05}Ru_{0.005}$, $(Co_{0.6}Ni_{0.4})_{0.91}Zr_{0.05}Ta_{0.04}$, or $(Co_{0.7}Ni_{0.3})_{0.9}Zr_{0.05}Mo_{0.05}$, each containing 0, 5, 7, 10 or 15% by atom of oxygen were formed to a thickness of 600 Å thereon through Cr intermediate layers 13 and 13' having a thickness of 2,500 Å, respectively. Then, protective layers of C, $B_4C$ or $SiO_2$ having a thickness of 400 Å were formed on the surface of the thin magnetic films, and further liquid lubricant layers composed of perfluoroalkylpolyether were formed to a thickness of 50 Å on the surfaces of the protective layers, whereby magnetic recording disks were prepared.

Then, the read-and-write characteristics of the thus obtained magnetic recording disks were evaluated with a thin film magnetic head having a gap length of 0.7 μm at a relative velocity of 13.5 m/s and a flying height of 0.22 μm. It was found that the output signal was lowered with increasing concentration of oxygen, and the noise of the medium was more lowered than the output signal, whereas the S/N ratio of the medium was increased with increasing concentration of oxygen to the contrary. This is due to a fact that the oxygen predominantly combines with Zr at the grain boundary to reduce the magnetic interaction among the grains and the transition region between the recorded bits is narrowed with increasing concentration of oxygen. At a concentration of oxygen of more than 15% by atom, the output signal was considerably lowered, and total S/N was rather lowered with respect to the head-medium system, and thus a concentration of oxygen of more than 15% by atom was not preferable.

Magnetic recording media having C layers formed to a thickness of 500 Å on the surfaces of a magnetic recording disk according to the embodiment of the present invention shown in FIG. 1 or FIG. 6 by DC magnetron sputtering at a substrate temperature of 150° C. in 5 m Torr of Ar with a power density of 8 W/cm$^2$ showed no change by oxidation even after more than 8 hours in the corrosion test shown in FIG. 3, and it was found that the corrosion resistance was considerably increased. Furthermore, it was found that the durability was $10^1$ to $10^5$ times higher than that of the magnetic recording disk without the C layers, and the provision of the C layers was preferable also with respect to the durability. The foregoing effects were observed so far as the thickness of the protective layer was 100 Å or more, but the read-and-write characteristics were considerably deteriorated with a thickness of more than 1,000 Å. Thus, a thickness of the protective layer of more than 1,000 Å was practically unpreferable. Similar effects were observed when protective layers of B, BN, or SiC were formed, or when the surfaces of the thin magnetic films were oxidized. By providing organic lubricant layers on the protective layers, the durability was further 2 or 3 times increased.

Figure 8:
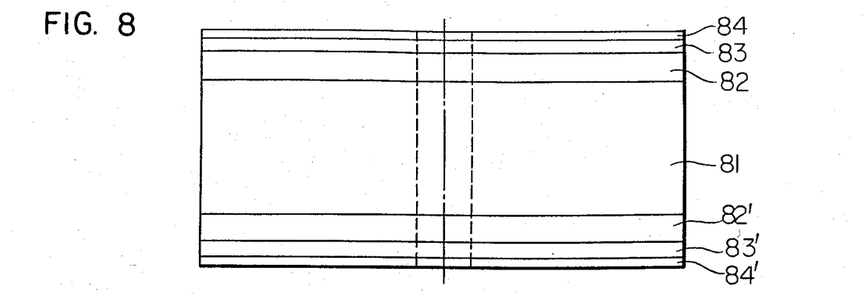
FIG. 8 is a cross-sectional view of a hard magnetic disk medium according to other embodiment of the present invention.

In FIG. 8, a further embodiment is shown, where numeral 81 is an Al substrate whose surfaces have been subjected to alumilite treatment, or an organic substrate of polyimide, PET or the like, 82 and 82' are the same intermediate layers as shown in FIG. 1, 83 and 83' are thin magnetic films of Co-Ni-Zr, and 84 and 84' are the same non-magnetic protective layers as described above. Their compositions, thickness of films or layers, and procedures for forming the films or layers are the same as described above.

In the foregoing embodiments, description has been made of hard magnetic disk media and floppy disk media by way of examples, but the effects of the present invention so far described are not only obtained in cases of these media, but are obtained also in cases of magnetic tape media, etc. Furthermore, the films or layers can be formed not only by sputtering, but also by evaporation, ion-beam sputtering, etc.

Further embodiments of thin magnetic films containing Hf will be described in detail below.

Thin magnetic films were formed to a thickness of 600 Å under the same conditions as the samples subjected to the test shown in FIG. 2, using $Co_{0.7}Ni_{0.3}$ alloy targets containing 0.05, 0.1, 1, 5, 10, 15, 20, or 25% by atom of Ti, Zr, V, Nb, Ta, Cr, Mo, W, Ru, Rh, Pd, Pt or Hf.

Figure 13:
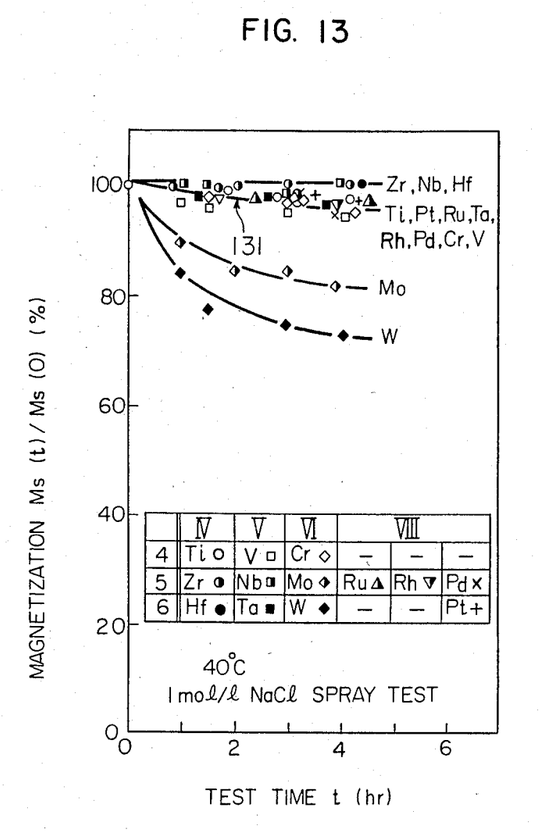
FIG. 13 and FIG. 14 are diagrams showing results of 1 mol/l-NaCl spray tests and 1 mol/l-NaCl dip tests for the present magnetic disks and comparative magnetic disks, respectively.

FIG. 13 shows changes with time in the saturation magnetization of magnetic disks containing 10% by atom of a third element on the basis of the total of Co and Ni according to spray tests using an aqueous 1 mol/l-NaCl solution at 40° C. 131 shows the results of magnetic disks using thin magnetic films of $Co_{0.7}Ni_{0.3}$ alloy, and it is apparent therefrom that the saturation magnetization is not deteriorated and a distinguished corrosion resistance can be obtained by the addition of Hf, Zr, or Nb. It was found that this effect could be substantially obtained, so far as a concentration of Hf, Zr or Nb was 0.1% by atom or higher.

Non-magnetic Ni-11 wt. % P plated layers 12 and 12' having a thickness of 15 µm were formed on the surfaces of an Al alloy substrate 11, 220 mm in outer diameter and 1.9 mm thick, and then Cr intermediate layers were formed to a thickness of 1,500 Å thereon at a substrate temperature of 150° C. in 10 m Torr of Ar at a gas flow rate of 20 SCCM and a DC power density of 7 W/cm$^2$, and thin magnetic films were further formed to a thickness of 500 Å thereon, using a $Co_{0.75}Ni_{0.25}$ alloy target containing 8% by atom of Hf, Zr, Rh, Nb, Pd, W or V under the same conditions as above.

Figure 14:
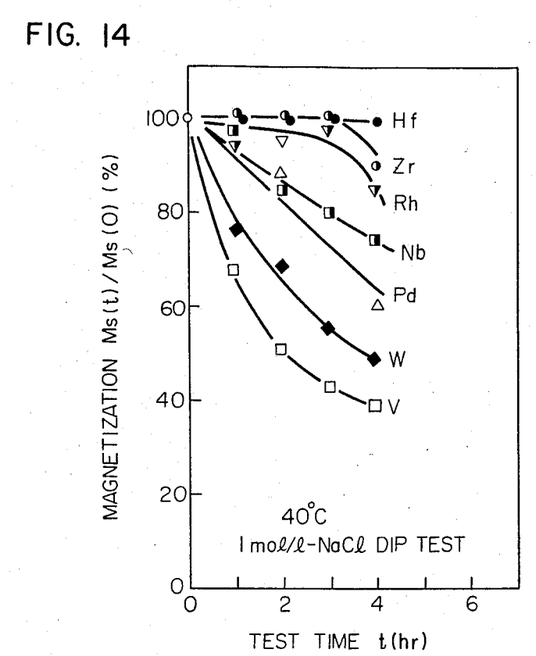

FIG. 14 shows changes with time in the saturation magnetization when the thus prepared magnetic recording disk was dipped into an aqueous 1 mol/l-NaCl solution. Particularly when Hf or Zr was contained, the corrosion resistance was considerably increased, and any of the thin magnetic films was predominantly polycrystalline in that case.

In case of forming Cr intermediate layers having a thickness of 2,000 Å and thin magnetic films having a thickness of 700 Å, using an alloy target of $Co_{0.9}Ni_{0.1}$, $Co_{0.6}Ni_{0.4}$, $Co_{0.4}Ni_{0.6}$ or $Co_{0.62}Ni_{0.3}Cr_{0.08}$, each containing 9% by atm of Hf, the same effects as in the foregoing two embodiments were observed by the addition of Hf, and the corrosion resistance was considerably increased by the addition of not less than 0.1% by atom of Hf. However, the coercivity and the saturation magnetization were considerably deteriorated by the addition of more than 30% by atom of Hf, and such an addition of more than 30% by atom of Hf was practically unpreferable. Further, it was found more preferable to add not more than 15% by atom of Hf thereto.

Figure 15:
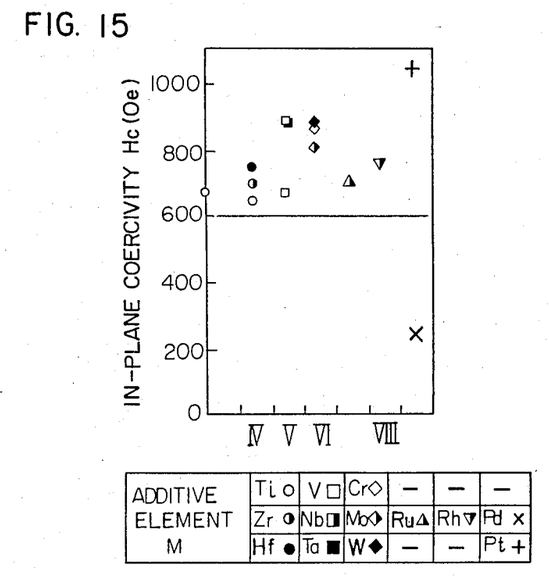
FIG. 15 and FIG. 16 are diagrams showing magnetic properties of the present magnetic disks and comparative magnetic disks.

FIG. 15 shows the in-plane coercivity for the magnetic disks shown in FIG. 13, where the in-plane coercivity is more than 600 Oe and distinguished read-and-write characteristics are obtained in all the magnetic disks except that containing Pd. A high in-plane coercive squareness was obtained in the magnetic disk containing Hf, Zr or Nb, and it was 0.94 for the disk containing Hf, 0.94 for that containing Zr and 0.93 for that containing Nb. The in-plane coercive squareness of the magnetic disk containing Ta, Cr, Ru, Rh or Pt was about 0.92, and that of the disk containing Ti, V, Mo or W was about 0.90. These levels were practically no problems. On the other hand, the magnetic disk containing Pd had quite a low in-plane coercive squareness such as 0.45, and was not suitable as recording media.

Figure 16:
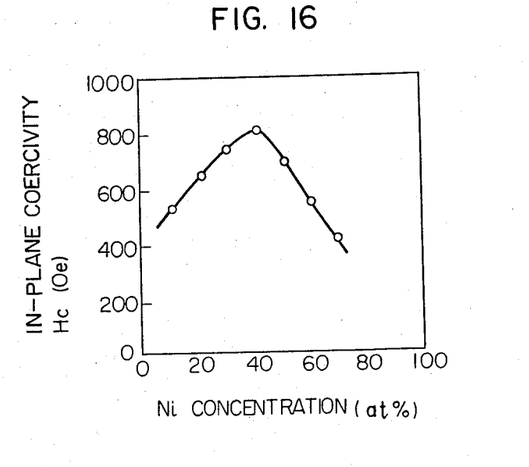

FIG. 16 shows a relationship between the in-plane coercivity and the concentration of Ni on the basis of Co, when thin magnetic films of Co-Ni containing 20% by atom of Hf were formed to a thickness of 600 Å on Cr intermediate layers having a thickness of 1,000 Å by DC magnetron sputtering in 7 m Torr of Ar with a power density of 8 W/cm$^2$, where an in-plane coercivity of more than about 550 Oe necessary for a high recording density can be obtained at a concentration of Ni of 10 to 60% by atom on the basis of Co. A much higher recording density can be obtained at a concentration of Ni of 20 to 50% by atom on the basis of Co and a concentration of Hf of 2 to 10% by atom on the basis of the total of Co and Ni. The same effect was observed with thin magnetic films containing Zr in place of Hf. Actually, a higher recording density than 20% FCI could be obtained with a Mn-Zn ferrite head having a gap length of 0.4 µm at a flying height of 0.28 µm.

When the thin magnetic films were formed directly on the Ni-P plating layers on the substrate in the foregoing embodiments, a coercivity of only about 50 Oe was obtained, but a practically sufficient coercivity could be obtained by forming the thin magnetic films through Cr intermediate layers having a thickness of not less than 100 Å. However, even when Cr intermediate layers having a thickness of more than 5,000 Å was formed, no more effect was obtained on the increase in the coercivity than when Cr intermediate layers having a thickness of not more than 5,000 Å were formed. Thus, the thickness of Cr intermediate layers was not more than 5,000 Å, desirably not more than 3,000 Å from the viewpoint of production efficiency.

When C intermediate layers 13 and 13' having a thickness of 10 Å were formed on Ni-W-P plated layers 12 and 12' on an aluminum alloy substrate 11 at a substrate temperature of 100° C. in 5 m Torr of Ar with a power density of 4 W/cm$^2$, and then thin magnetic films of $(Co_{0.6}Ni_{0.4})_{0.91}Hf_{0.09}$ 14 and 14' were formed to a thickness of 0.2 μm thereon, whereby a magnetic recording medium having distinguished corrosion resistance and perpendicular magnetic recording characteristics could be obtained. The same results as above could be obtained with Si intermediate layers having a thickness of 50 Å or Ge intermediate layers having a thickness of 90 Å. The effect of intermediate layers was observed when a thickness of intermediate layers was not less than 5 Å. However, a thickness of not more than 100 Å was practically satisfactory.

Magnetic recording disks of the structure shown in FIG. 6 were prepared in the same manner as already described above, except that both Zr and Hf were contained in the thin magnetic films. That is, thin magnetic films were formed to a thickness of 600 Å with a Co-Ni alloy target containing 4% by atom of Zr and 5, 10 or 15% by atom of Hf.

Figure 17:
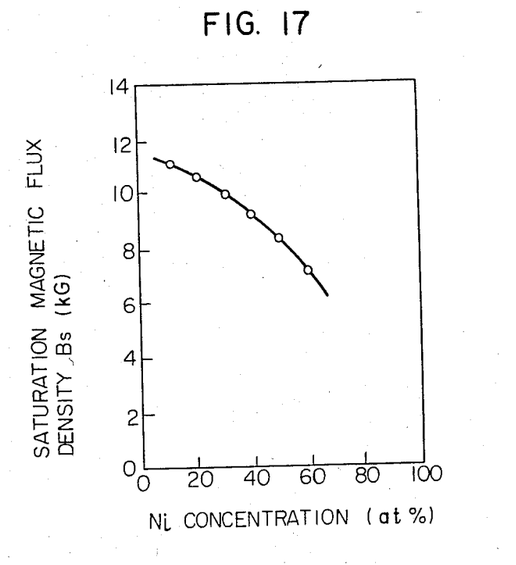
FIG. 17 is a diagram showing a magnetic property according to other embodiment of the present invention.

FIG. 17 shows a relationship between the saturation magnetic flux density of a thin magnetic film containing 5% by atom of Hf and 4.0% by atom of Zr on the basis of the total of Co and Ni and the concentration of Ni on the basis of Co is shown. It is apparent therefrom that a practically satisfactory saturation magnetic flux density can be obtained at a concentration of Ni of not more than 50% by atom. An in-plane coercivity at the same level as that shown in FIG. 16 could be obtained, and distinguished read-and-write characteristics as those of the magnetic recording disk shown in FIG. 1 could be obtained. It was found that the corrosion resistance was a little inferior to that of the magnetic recording disk shown in FIG. 1, but had no problem at the practical level.

In other embodiment than the foregoing embodiment, thin magnetic films were formed in $O_2$-containing Ar to form magnetic recording disks with thin magnetic films having a concentration of oxygen of 0.1 to 15% by atom. Though there were such disadvantages that the saturation magnetization was reduced and the corrosion resistance was a little deteriorated, the magnetic recording disks without any practical problem could be obtained.

Magnetic recording media having C protective layers formed to a thickness of 400 Å on the surfaces of a magnetic recording disk according to the embodiment of the present invention shown in FIG. 1 or FIG. 6 by DC magnetron sputtering at a substrate temperature of 150° C. in 5 m Torr of Ar with a power density of 8 W/cm$^2$ showed no change in the magnetization even after more than 8 hours in the corrosion test shown in FIG. 14, and it was found that the corrosion resistance was considerably increased. Furthermore, it was found that the durability was $10^1$ to $10^4$ times higher than that of the magnetic recording disk without the C protective layers, and the provision of the C protective layers was preferable also with respect to the durability. The foregoing effects were observed so far as the thickness of the protective layer was 100 Å or more, but the read-and-write characteristics were considerably deteriorated with a thickness of more than 1,000 Å. Thus, a thickness of the protective layer of more than 1,000 Å was practically unpreferable. Similar effects were observable when protective layers of B, B-15 at.% C, or SiC were formed, or when the surfaces of the thin magnetic films were oxidized. By providing an organic lubricant layers on the protective layers, the durability was further 2 or 3 times increased.

What is claimed is:

1. A magnetic recording medium which comprises a non-magnetic substrate and a thin magnetic film formed thereon, the thin magnetic film consisting essentially of Co, Ni and Zr, and a concentration of Zr being 0.1 to 30% by atom on the total of Co and Ni wherein said Zr is concentrated predominantly near the surface of the thin magnetic film.

2. A magnetic recording medium according to claim 1, wherein the concentration of Zr is 2 to 20% by atom on the total of Co and Ni.

3. A magnetic recording medium according to claim 1, wherein a concentration of Ni is 10 to 60% by atom on the basis of Co.

4. A magnetic recording medium according to claim 1, wherein a concentration of Ni is 20 to 50% by atom on the basis of Co, and the concentration of Zr is 2 to 20% by atom on the basis of the total of Co and Ni.

5. A magnetic recording medium according to claim 1, wherein the thin magnetic film contains 0.01 to 15% by atom in total of at least one of Ti, Pt, Ru, Ta, Rh, V, Nb, Cr, and Pd besides Co, Ni, and Zr.

6. A magnetic recording medium according to claim 1, wherein 0.1 to 15% by atom of oxygen is contained in the thin magnetic film.

7. A magnetic recording medium according to claim 1, wherein a Cr intermediate layer having a thickness of 100 to 5,000 Å is provided between the non-magnetic substrate and the thin magnetic film.

8. A magnetic recording medium according to claim 1, wherein the thin magnetic film is a perpendicular magnetic recording layer, and at least one of Si intermediate layer, C intermediate layer and Ge intermediate layer having a thickness of 20 to 1,000 Å is provided between the non-magnetic substrate and the thin magnetic film.

9. A magnetic recording medium according to claim 1, wherein a non-magnetic protective layer having a thickness of 100 to 1,000 Å is formed on the surface of the thin magnetic film.

10. A magnetic recording medium according to claim 1, wherein the non-magnetic substrate is an Al alloy plated with NiP or NiWP.

11. A magnetic recording medium according to claim 10, wherein the non-magnetic substrate is a non-magnetic metallic plate whose surface is oxidized to a depth of 10 to 400 Å.

12. A magnetic recording medium, which comprises a non-magnetic substrate and a thin magnetic film formed thereon, the thin magnetic film consisting essentially of Co, Ni and Hf, and a concentration of Hf being 0.1 to 30% by atom on the basis of the total of Co and Ni wherein said Hf is concentrated predominantly near the surface of the thin magnetic film.

13. A magnetic recording medium according to claim 12, wherein a concentration of Ni is 10 to 60% by atom on the basis of Co.

14. A magnetic recording medium according to claim 12, wherein a Cr intermediate layer having a thickness of 100 to 5,000 Å is provided between the non-magnetic substrate and the thin magnetic film.

15. A magnetic recording medium according to claim 12, wherein the non-magnetic substrate is a non-magnetic metallic substrate whose surface is oxidized to a depth of 10 to 400 Å.

16. A magnetic recording medium according to claim 12, wherein at least one of Si intermediate layer, C intermediate layer and Ge intermediate layer having a thickness of 5 to 100 Å is provided between the non-magnetic substrate and the thin magnetic film.

17. A magnetic recording medium according to claim 12, wherein a non-magnetic protective layer having a thickness of 100 to 1,000 Å is formed on the surface of the thin magnetic film.

18. A magnetic recording medium, which comprises a non-magnetic substrate and a thin magnetic film formed thereon, the thin magnetic film being consisting essentially of Co, Ni, Hf and Zr, and a concentration of Hf and Zr being 0.1 to 30% by atom on the basis of the total of Co and Ni wherein said Zr and said Hf are concentrated predominantly near the surface of the tine magnatic film.

19. A magnetic recording medium according to claim 18, wherein a concentration of Ni is 10 to 60% by atom on the basis of Co.

20. A magnetic recording medium according to claim 19, wherein a concentration of Ni is 20 to 50% by atom on the basis of Co, and the concentration of Hf and Zr is 0.1 to 15% by atom on the basis of the total of Co and Ni.

21. A magnetic recording medium according to claim 18, wherein a Cr intermediate layer having a thickness of 100 to 5,000 Å is provided between the non-magnetic substrate and the thin magnetic film.

22. A magnetic recording medium according to claim 18, wherein the non-magnetic substrate is a non-magnetic metallic substrate whose surface is oxidized to a depth of 10 to 400 Å.

23. A magnetic recording medium according to claim 19, wherein at least one of Si intermediate layer, C intermediate layer and Ge intermediate layer having a thickness of 5 to 100 Å is provided between the non-magnetic substrate and the thin magnetic film.

24. A magnetic recording medium according to claim 18, wherein a non-magnetic protective layer having a thickness of 100 to 1,000 Å is formed on the surface of the thin magnetic film.

25. A magnetic recording medium which comprises a non-magnetic substrate and a thin magnetic film formed thereon, the thin magnetic film consisting essentially of Co, Ni and either Zr, Hf, or mixtures thereof, a concentration of Ni being 10 to 60% by atom on the basis of Co and a concentration of Zr, Hf, or mixtures thereof being 0.1 to 30% by atom on the total of Co and Ni; the Zr, Hf or mixtures thereof being concentrated predominantly near the surface of the thin magnetic film.

26. A magnetic recording medium according to claim 25, wherein the thin magnetic film consists of Co, Ni and either Zr, Hf, or mixtures thereof.

* * * * *